(12) United States Patent
Batishchev

(10) Patent No.: US 10,296,764 B1
(45) Date of Patent: May 21, 2019

(54) VERIFIABLE CRYPTOGRAPHICALLY SECURED LEDGERS FOR HUMAN RESOURCE SYSTEMS

(71) Applicant: Amazon Technologies, Inc., Seattle, WA (US)

(72) Inventor: Andriy Batishchev, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/356,462

(22) Filed: Nov. 18, 2016

(51) Int. Cl.
*G06F 7/04* (2006.01)
*G06F 21/64* (2013.01)
*G06F 21/60* (2013.01)
*G06Q 10/10* (2012.01)

(52) U.S. Cl.
CPC ............ *G06F 21/64* (2013.01); *G06F 21/602* (2013.01); *G06Q 10/105* (2013.01)

(58) Field of Classification Search
CPC ...... G06F 21/64; G06F 21/602; G06Q 10/105
USPC ........................................................ 726/26
See application file for complete search history.

(56) References Cited

U.S. PATENT DOCUMENTS

| | | | |
|---|---|---|---|
| 5,729,671 A | 3/1998 | Peterson et al. | |
| 6,249,836 B1 | 6/2001 | Downs et al. | |
| 6,779,150 B1 | 8/2004 | Walton et al. | |
| 6,862,362 B2 | 3/2005 | Gangadhar | |
| 7,117,294 B1 | 10/2006 | Mi et al. | |
| 7,142,150 B2 | 11/2006 | Thackray | |
| 7,380,129 B2 | 5/2008 | Keohane et al. | |
| 7,490,013 B2 | 2/2009 | Wells | |
| 7,693,813 B1 | 4/2010 | Cao et al. | |
| 7,783,600 B1 | 8/2010 | Spertus et al. | |
| 7,805,706 B1 | 9/2010 | Ly et al. | |
| 7,930,611 B2 | 4/2011 | Huang et al. | |
| 8,261,033 B1 | 9/2012 | Slik et al. | |
| 8,386,841 B1 | 2/2013 | Renade | |
| 8,413,187 B1 | 4/2013 | Del Sesto et al. | |
| 8,479,078 B2 | 7/2013 | Resch et al. | |
| 8,504,518 B1 | 8/2013 | Ghemawat et al. | |
| 8,504,535 B1 | 8/2013 | He et al. | |
| 8,612,219 B2 | 12/2013 | Tsuchinaga et al. | |

(Continued)

FOREIGN PATENT DOCUMENTS

| | | | |
|---|---|---|---|
| JP | 2004531923 A | 10/2004 | |
| KR | 20130107383 A | 10/2013 | |

(Continued)

OTHER PUBLICATIONS

"New! xTablet T7000 Rugged Mini Tablet PC," MobileDemand, copyright 2012 [web archive Mar. 12, 2012], https://web.archive.org/web/20120312010139/http://www.ruggedtabletpc.com/products/xtablet-t7000-rugged-mini-tablet-pc/, 3 pages.

(Continued)

*Primary Examiner* — Mohammad W Reza
(74) *Attorney, Agent, or Firm* — Davis Wright Tremaine LLP; Timothy Chou

(57) ABSTRACT

One or more human resources systems implements one or more cryptographically secured ledger(s) to persist transactions related to administered objects, such as employee objects. Attribute and/or state changes associated with a given employee object are represented as transactions between accounts that represent different attributes and/or states.

20 Claims, 7 Drawing Sheets

(56) References Cited

U.S. PATENT DOCUMENTS

| | | |
|---|---|---|
| 8,621,069 B1 | 12/2013 | Tompkins |
| 8,706,980 B2 | 4/2014 | Dhuse et al. |
| 8,769,049 B2 | 7/2014 | Murphy et al. |
| 8,788,855 B2 | 7/2014 | Cong et al. |
| 8,806,296 B1 | 8/2014 | Lazier |
| 8,850,288 B1 | 9/2014 | Lazier et al. |
| 8,868,825 B1 | 10/2014 | Hayes et al. |
| 8,869,001 B1 | 10/2014 | Lazier |
| 8,935,221 B1 | 1/2015 | Lazier et al. |
| 8,935,761 B2 | 1/2015 | Gladwin et al. |
| 8,938,591 B2 | 1/2015 | Mark et al. |
| 8,959,067 B1 | 2/2015 | Patiejunas et al. |
| 8,984,363 B1 | 3/2015 | Juels et al. |
| 8,984,384 B1 | 3/2015 | Juels et al. |
| 9,002,805 B1 | 4/2015 | Barber et al. |
| 9,003,144 B1 | 4/2015 | Hayes et al. |
| 9,009,491 B2 | 4/2015 | Resch |
| 9,021,297 B1 | 4/2015 | Hayes et al. |
| 9,047,214 B1 | 6/2015 | Northcott |
| 9,052,942 B1 | 6/2015 | Barber et al. |
| 9,092,441 B1 | 7/2015 | Patiejunas et al. |
| 9,110,797 B1 | 8/2015 | Lazier |
| 9,165,002 B1 | 10/2015 | Lazier |
| 9,208,018 B1 | 12/2015 | Northcott et al. |
| 9,213,485 B1 | 12/2015 | Hayes et al. |
| 9,213,709 B2 | 12/2015 | Patiejunas et al. |
| 9,218,244 B1 | 12/2015 | Hayes et al. |
| 9,223,789 B1 | 12/2015 | Seigle et al. |
| 9,225,675 B2 | 12/2015 | Patiejunas et al. |
| 9,244,761 B2 | 1/2016 | Yekhanin et al. |
| 9,250,811 B1 | 2/2016 | Patiejunas |
| 9,251,097 B1 | 2/2016 | Kumar et al. |
| 9,256,467 B1 | 2/2016 | Singh et al. |
| 9,256,761 B1 | 2/2016 | Sahu et al. |
| 9,271,052 B2 | 2/2016 | Holden |
| 9,281,845 B1 | 3/2016 | Lazier |
| 9,298,760 B1 | 3/2016 | Li et al. |
| 9,298,806 B1 | 3/2016 | Vessenes et al. |
| 9,354,683 B2 | 5/2016 | Patiejunas et al. |
| 9,378,084 B2 | 6/2016 | Calder et al. |
| 9,397,985 B1 | 7/2016 | Seger, II et al. |
| 9,405,333 B1 | 8/2016 | Pine |
| 9,448,614 B2 | 9/2016 | Slik |
| 9,459,959 B1 | 10/2016 | Franklin et al. |
| 9,495,249 B1 | 11/2016 | Franklin et al. |
| 9,495,255 B2 | 11/2016 | Davis et al. |
| 9,513,820 B1 | 12/2016 | Shalev |
| 9,563,681 B1 | 2/2017 | Patiejunas et al. |
| 9,608,829 B2 | 3/2017 | Spanos et al. |
| 9,672,110 B1 | 6/2017 | Patel |
| 9,753,669 B2 | 9/2017 | Ben-Shaul et al. |
| 9,785,495 B1 | 10/2017 | Lazier et al. |
| 9,792,179 B1 | 10/2017 | Lazier |
| 9,825,625 B2 | 11/2017 | Thalheim |
| 9,825,652 B1 | 11/2017 | Lazier |
| 9,838,041 B1 | 12/2017 | Lazier |
| 9,838,042 B1 | 12/2017 | Lazier |
| 9,853,662 B1 | 12/2017 | Lazier et al. |
| 9,866,242 B1 | 1/2018 | Lazier |
| 9,904,589 B1 | 2/2018 | Donlan et al. |
| 9,923,966 B1 | 3/2018 | Franklin et al. |
| 9,998,539 B1 | 6/2018 | Brock et al. |
| 2003/0172325 A1 | 9/2003 | Wyatt et al. |
| 2004/0040025 A1 | 2/2004 | Lehtinen |
| 2004/0054997 A1 | 3/2004 | Katragadda et al. |
| 2004/0128470 A1 | 7/2004 | Hetzler et al. |
| 2004/0230764 A1 | 11/2004 | Merchant et al. |
| 2004/0268037 A1 | 12/2004 | Buchanan et al. |
| 2006/0004675 A1 | 1/2006 | Bennett et al. |
| 2006/0064709 A1 | 3/2006 | Throckmorton et al. |
| 2006/0080574 A1 | 4/2006 | Saito et al. |
| 2006/0136928 A1 | 6/2006 | Crawford et al. |
| 2006/0168575 A1 | 7/2006 | Bhatt et al. |
| 2006/0168581 A1 | 7/2006 | Goger et al. |
| 2007/0118657 A1 | 5/2007 | Kreitzer et al. |
| 2007/0124020 A1 | 5/2007 | Staples |
| 2007/0156842 A1 | 7/2007 | Vermeulen et al. |
| 2007/0180294 A1 | 8/2007 | Kameyama et al. |
| 2007/0245331 A1 | 10/2007 | Daynes et al. |
| 2008/0189705 A1 | 8/2008 | Weinert et al. |
| 2009/0094250 A1 | 4/2009 | Dhuse et al. |
| 2009/0319078 A1 | 12/2009 | Jackson |
| 2010/0131792 A1 | 5/2010 | Herrod |
| 2010/0138764 A1 | 6/2010 | Hatambeiki et al. |
| 2010/0153941 A1 | 6/2010 | Borissov et al. |
| 2010/0306267 A1 | 12/2010 | Zamkoff et al. |
| 2010/0318999 A1 | 12/2010 | Zhao et al. |
| 2010/0328528 A1 | 12/2010 | Eggert |
| 2010/0332751 A1 | 12/2010 | Quigley et al. |
| 2011/0022633 A1 | 1/2011 | Bernosky et al. |
| 2011/0055661 A1 | 3/2011 | Grube et al. |
| 2011/0078277 A1 | 3/2011 | Baptist |
| 2011/0202929 A1 | 8/2011 | Schleimer et al. |
| 2011/0225209 A1 | 9/2011 | Volvovski et al. |
| 2011/0225426 A1 | 9/2011 | Agarwal et al. |
| 2011/0264717 A1 | 10/2011 | Grube et al. |
| 2011/0289263 A1 | 11/2011 | McWilliams et al. |
| 2011/0296195 A1 | 12/2011 | Nakagawa et al. |
| 2011/0296440 A1 | 12/2011 | Laurich et al. |
| 2012/0011398 A1 | 1/2012 | Eckhardt et al. |
| 2012/0017096 A1 | 1/2012 | Snider |
| 2012/0079189 A1 | 3/2012 | Colgrove et al. |
| 2012/0079190 A1 | 3/2012 | Colgrove et al. |
| 2012/0110150 A1 | 5/2012 | Kosuru et al. |
| 2012/0185437 A1 | 7/2012 | Pavlov et al. |
| 2012/0243687 A1 | 9/2012 | Li et al. |
| 2012/0254089 A1 | 10/2012 | Alba et al. |
| 2012/0254175 A1 | 10/2012 | Horowitz et al. |
| 2012/0254690 A1 | 10/2012 | Resch et al. |
| 2012/0290539 A1 | 11/2012 | Bryant et al. |
| 2012/0322422 A1 | 12/2012 | Frecks, Jr. et al. |
| 2012/0331088 A1 | 12/2012 | O'Hare et al. |
| 2013/0007511 A1 | 1/2013 | Gaertner et al. |
| 2013/0029641 A1 | 1/2013 | Hickie |
| 2013/0073600 A1 | 3/2013 | Jenkins et al. |
| 2013/0109371 A1 | 5/2013 | Brogan et al. |
| 2013/0191527 A1 | 7/2013 | Ashok et al. |
| 2013/0238932 A1 | 9/2013 | Resch |
| 2013/0275776 A1 | 10/2013 | Baptist et al. |
| 2013/0297964 A1 | 11/2013 | Hegdal et al. |
| 2013/0304711 A1 | 11/2013 | Resch |
| 2013/0326583 A1 | 12/2013 | Freihold et al. |
| 2014/0006458 A1 | 1/2014 | Hsieh et al. |
| 2014/0006850 A1 | 1/2014 | Aliev et al. |
| 2014/0007214 A1 | 1/2014 | Qureshi et al. |
| 2014/0046906 A1 | 2/2014 | Patiejunas et al. |
| 2014/0046908 A1 | 2/2014 | Patiejunas et al. |
| 2014/0046909 A1 | 2/2014 | Patiejunas et al. |
| 2014/0047040 A1 | 2/2014 | Patiejunas et al. |
| 2014/0047261 A1 | 2/2014 | Patiejunas et al. |
| 2014/0108421 A1 | 4/2014 | Isaacson et al. |
| 2014/0122572 A1 | 5/2014 | Finkelstein et al. |
| 2014/0149794 A1 | 5/2014 | Shetty et al. |
| 2014/0149986 A1 | 5/2014 | S M et al. |
| 2014/0153481 A1 | 6/2014 | Draznin et al. |
| 2014/0156632 A1 | 6/2014 | Yu et al. |
| 2014/0173058 A1 | 6/2014 | Twitchell, Jr. |
| 2014/0189388 A1 | 7/2014 | Lynar et al. |
| 2014/0201541 A1 | 7/2014 | Paul et al. |
| 2014/0298134 A1 | 10/2014 | Grube et al. |
| 2014/0304356 A1 | 10/2014 | Allen, Sr. et al. |
| 2014/0310571 A1 | 10/2014 | Fetterly et al. |
| 2014/0344446 A1 | 11/2014 | Rjeili et al. |
| 2014/0351632 A1 | 11/2014 | Grube et al. |
| 2014/0372383 A1 | 12/2014 | Sipek |
| 2014/0380126 A1 | 12/2014 | Yekhanin et al. |
| 2015/0149870 A1 | 5/2015 | Kozat |
| 2015/0169716 A1 | 6/2015 | Franklin et al. |
| 2015/0244690 A1 | 8/2015 | Mossbarger |
| 2015/0269570 A1 | 9/2015 | Phan et al. |
| 2015/0278324 A1 | 10/2015 | Wong et al. |
| 2015/0324745 A1 | 11/2015 | Goodall et al. |
| 2015/0331635 A1 | 11/2015 | Ben-Shaul et al. |
| 2015/0355974 A1 | 12/2015 | Hayes et al. |

(56) References Cited

U.S. PATENT DOCUMENTS

| | | |
|---|---|---|
| 2015/0356005 A1 | 12/2015 | Hayes et al. |
| 2016/0011816 A1 | 1/2016 | Aizman |
| 2016/0028552 A1 | 1/2016 | Spanos et al. |
| 2016/0034295 A1 | 2/2016 | Cochran |
| 2016/0041868 A1 | 2/2016 | Davis et al. |
| 2016/0041869 A1 | 2/2016 | Davis et al. |
| 2016/0041878 A1 | 2/2016 | Davis et al. |
| 2016/0041887 A1 | 2/2016 | Davis et al. |
| 2016/0048399 A1 | 2/2016 | Shaw |
| 2016/0062623 A1 | 3/2016 | Howard et al. |
| 2016/0085797 A1 | 3/2016 | Patiejunas et al. |
| 2016/0092248 A1 | 3/2016 | Shani et al. |
| 2016/0179824 A1 | 6/2016 | Donlan et al. |
| 2016/0216991 A1 | 7/2016 | Ansari et al. |
| 2016/0218879 A1 | 7/2016 | Ferrin |
| 2016/0253663 A1 | 9/2016 | Clark et al. |
| 2016/0292672 A1 | 10/2016 | Fay et al. |
| 2016/0330034 A1 | 11/2016 | Back et al. |
| 2016/0335310 A1 | 11/2016 | Lahiri et al. |
| 2016/0342977 A1 | 11/2016 | Lam |
| 2016/0379212 A1 | 12/2016 | Bowman et al. |
| 2017/0024281 A1 | 1/2017 | Franklin et al. |
| 2017/0054611 A1 | 2/2017 | Tiell |
| 2017/0060687 A1 | 3/2017 | Franklin et al. |
| 2017/0115976 A1* | 4/2017 | Mills ............. G06F 8/71 |
| 2017/0180134 A1 | 6/2017 | King |
| 2017/0206382 A1 | 7/2017 | Rodriguez De Castro et al. |
| 2017/0222814 A1 | 8/2017 | Oberhauser et al. |
| 2017/0237570 A1 | 8/2017 | Vandervort |
| 2017/0250801 A1 | 8/2017 | Chen et al. |
| 2017/0278186 A1 | 9/2017 | Creighton, IV et al. |
| 2017/0293669 A1 | 10/2017 | Madhavan et al. |
| 2017/0300627 A1 | 10/2017 | Giordano et al. |
| 2017/0331896 A1 | 11/2017 | Holloway et al. |
| 2017/0364846 A1* | 12/2017 | McConnell ......... G06Q 10/105 |
| 2018/0082256 A1* | 3/2018 | Tummuru ......... G06Q 10/1053 |

FOREIGN PATENT DOCUMENTS

| | | |
|---|---|---|
| WO | 02071382 A1 | 9/2002 |
| WO | 2014047073 A1 | 3/2014 |

OTHER PUBLICATIONS

Amazon, "Batch Cloud Data Transfer Services—Amazon Import/Export Snowball Appliance," Jun. 17, 2016, retrieved Oct. 8, 2016, https://web.archive.org/web/20160617044144/http://aws.amazon.com/importexport/, 6 pages.

Barr, "AWS Import/Export: Ship Us That Disk!," Amazon Web Services Blog, May 21, 2009, retrieved Mar. 14, 2017, https://aws.amazon.com/blogs/aws/send-us-that-data/, 7 pages.

Binns, "Elasticsearch Failure and Recovery," TechRabbit, Oct. 31, 2014 [retrieved Nov. 17, 2017], http://tech.taskrabbit.com/blog/2014/10/31/es-failure-recovery/, four pages.

Dang, "Recommendation for Applications Using Approved Hash Algorithms," National Institute of Standards and Technology (NIST) Special Publication 800-107 Revision 1, Aug. 2010, retrieved Nov. 24, 2015, http://csrc.nist.gov/publications/nistpubs/800-107-rev1/sp800-107-rev1.pdf, 25 pages.

Franco, "Understanding Bitcoin: Cryptography, Engineering and Economics," Wiley, Nov. 24, 2014, 167 pages.

He et al., "Elastic Application Container: A Lightweight Approach for Cloud Resource Provisioning," 26th IEEE International Conference on Advanced Information Networking and Applications, Mar. 26, 2012, pp. 15-22.

International Organization for Standardization/ International Electrotechnical Commission, "Information technology—Trusted Platform Module—Part 1: Overview," International Standard, ISO/IEC 11889-1(E), May 15, 2009, 20 pages.

International Organization for Standardization/International Electrotechnical Commission, "Information technology—Trusted Platform Module—Part 2: Design principles," International Standard, ISO/IEC 11889-2(E), May 15, 2009, 152 pages.

International Organization for Standardization/International Electrotechnical Commission, "Information technology—Trusted Platform Module—Part 3: Structures," International Standard, ISO/IEC 11889-3:2009(E), 204 pages.

International Organization for Standardization/International Electrotechnical Commission, "Information technology—Trusted Platform Module—Part 4: Commands," International Standard, ISO/IEC 11889-4:2009(E), 254 pages.

International Search Report and Written Opinion in International Patent Application No. PCT/US2015/050513, dated Feb. 16, 2016, 22 pages.

International Search Report and Written Opinion dated Aug. 25, 2016, International Patent Application No. PCT/US2016/040510, filed Jun. 30, 2016.

International Search Report and Written Opinion dated Feb. 4, 2016, International Patent Application No. PCT/US2015/059983, 12 pages.

International Search Report and Written Opinion dated Nov. 22, 2017, International Patent Application No. PCT/US2017/054319, filed Sep. 29, 2017, 14 pages.

Kim, "How Sharding Works," Medium, Dec. 5, 2014 [retrieved Nov. 17, 2017], https://medium.com/@jeeyoungk/how-sharding-works-b4dec46b3f6, 12 pages.

Maccarthaigh, "Shuffle Sharding: Massive and Magical Fault Isolation," AWS Architecture Blog, Apr. 14, 2014 [retrieved Nov. 27, 2017], https://aws.amazon.com/blogs/architecture/shuffle-sharding-massive-and-magical-fault-isolation/, six pages.

Pikkarainen et al., "The impact of agile practices on communication in software development," Empirical Software Engineering 13(3):303-37, Jun. 1, 2008.

Ramamritham, "Allocation and scheduling of precedence-related periodic tasks," IEEE Transactions on Parallel and Distributed Systems 6(4):412-420, Apr. 1995.

Soltesz et al., "Container-based operating system virtualization: a scalable, high-performance alternative to hypervisors," ACM SIGOPS Operating Systems Review 41(3):275-287, Mar. 2007.

Storer et al., "POTSHARDS—A Secure, Recoverable, Long-Term Archival Storage System," ACM Transactions on Storage, Published Jun. 2009, vol. 5, No. 2, Article 5, pp. 5:1 to 5:35.

Swan, "Blockchain: Blueprint for a New Economy," O'Reilly Media, Inc., Jan. 22, 2015, 144 pages.

Thiele et al., "Embedded Software in Network Processors—Models and Algorithms," Lecture Notes in Computer Science 2211:416-34, Oct. 8, 2001.

Third-Party Submission Under 37 CFR 1.290 dated Apr. 24, 2018, U.S. Appl. 15/283,017, filed Sep. 30, 2016, 10 pages.

Trusted Computing Group, "TPM Main, Part 1 Design Principles," Specification Version 1.2, Level 2 Revision 103, Jul. 9, 2007, 182 pages.

Trusted Computing Group, "TPM Main, Part 1 Design Principles," Specification Version 1.2, Revision 116, Mar. 1, 2011, 184 pages.

Trusted Computing Group, "TPM Main, Part 2 TPM Structures," Specification Version 1.2, Level 2 Revision 103, Jul. 9, 2007, 198 pages.

Trusted Computing Group, "TPM Main, Part 2 TPM Structures," Specification Version 1.2, Revision 116, Mar. 1, 2011, 201 pages.

Trusted Computing Group, "TPM Main, Part 3 Commands," Specification Version 1.2, Level 2 Revision 103, Jul. 9, 2007, 330 pages.

Trusted Computing Group, "TPM Main, Part 3 Commands," Specification Version 1.2, Revision 116, Mar. 1, 2011, 339 pages.

Van et al., "SLA-aware Virtual Resource Management for Cloud Infrastructures," IEEE Ninth International Conference on Computer and Information Technology, Oct. 11, 2009, pp. 357-362.

Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.

Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.

Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.

(56) References Cited

OTHER PUBLICATIONS

Xavier et al., "Performance evaluation of container-based virtualization for high performance computing environments," Parallel, Distributed and Network-Based Processing (PDP), 2013 21st Euromicro International Conference, Feb. 2013, pp. 233-240.

Zhao et al., "Experimental study of virtual machine migration in support of reservation of cluster resources," Proceedings of the 2nd international workshop on Virtualization technology in distributed computing, Nov. 2007, pp. 1-8.

Zheng et al., "Grid-partition index: a hybrid method for nearest-neighbor queries in wireless location-based services," The VLDB Journal—The International Journal on Very Large Data Bases 15(1):21-39, online publication Jul. 22, 2005, print publication Jan. 1, 2006.

Zyga, "Light-up Cereal Boxes Powered by Shelvers on Display at CES," Phys.org, Jan. 11, 2011, retrieved May 19, 2015, http://phys.org/news/201101lightupcerealpoweredshelvesces.html, 13 pages.

IEEE 100, "The Authoritative Dictionary of IEEE Standards Terms", Seventh Edition, IEEE Standards Information Network, IEEE Press, Dec. 2000, 5 pages (pertinent pp. 1, 2, 155, 207, 1112.

\* cited by examiner

VERIFIABLE CRYPTOGRAPHICALLY SECURED LEDGERS FOR HUMAN RESOURCE SYSTEMS

CROSS REFERENCE TO RELATED APPLICATIONS

This application incorporates by reference for all purposes the full disclosure of co-pending U.S. patent application Ser. No. 15/283,017, filed Sep. 30, 2016, entitled "IMMUTABLE CRYPTOGRAPHICALLY SECURED LEDGER-BACKED DATABASES" and co-pending U.S. patent application Ser. No. 15/195,803, filed Jun. 28, 2016, entitled "COMBINED BLOCKCHAIN INTEGRITY."

BACKGROUND

Distributed computing and storage systems and services, such as those provided by computing resource service providers (e.g., over the Internet), are increasingly utilized by enterprises and individual users to augment, and in some cases, replace on-premise computing resources. However, as such distributed systems and services are not necessarily under complete control of the implementing user or enterprise, the integrity of transactions made therewith can be difficult to ascertain (from the perspective of the user), and difficult for which to provide assurances (from the perspective of the service provider). Additionally, a given data object or entity may be represented and modified by multiple disparate elements of a system, or different systems altogether, and may thus suffer from a lack of verifiable consistency with respect to the data object or entity's state at a given point in time.

For example, a human resources system (or plurality of such systems) may be implemented to track the state of an organization's employees, as well as that of other verticals and hierarchies associated with those employees (e.g., cost centers, departments, job titles, and the like). For various reasons, such systems would benefit from time-state consistency (whether eventually or synchronously guaranteed), auditability, and/or immutability with respect to transactions, such as state changes, associated with the represented employees or other objects.

BRIEF DESCRIPTION OF THE DRAWINGS

Various techniques will be described with reference to the drawings, in which.

DETAILED DESCRIPTION

Figure 1:
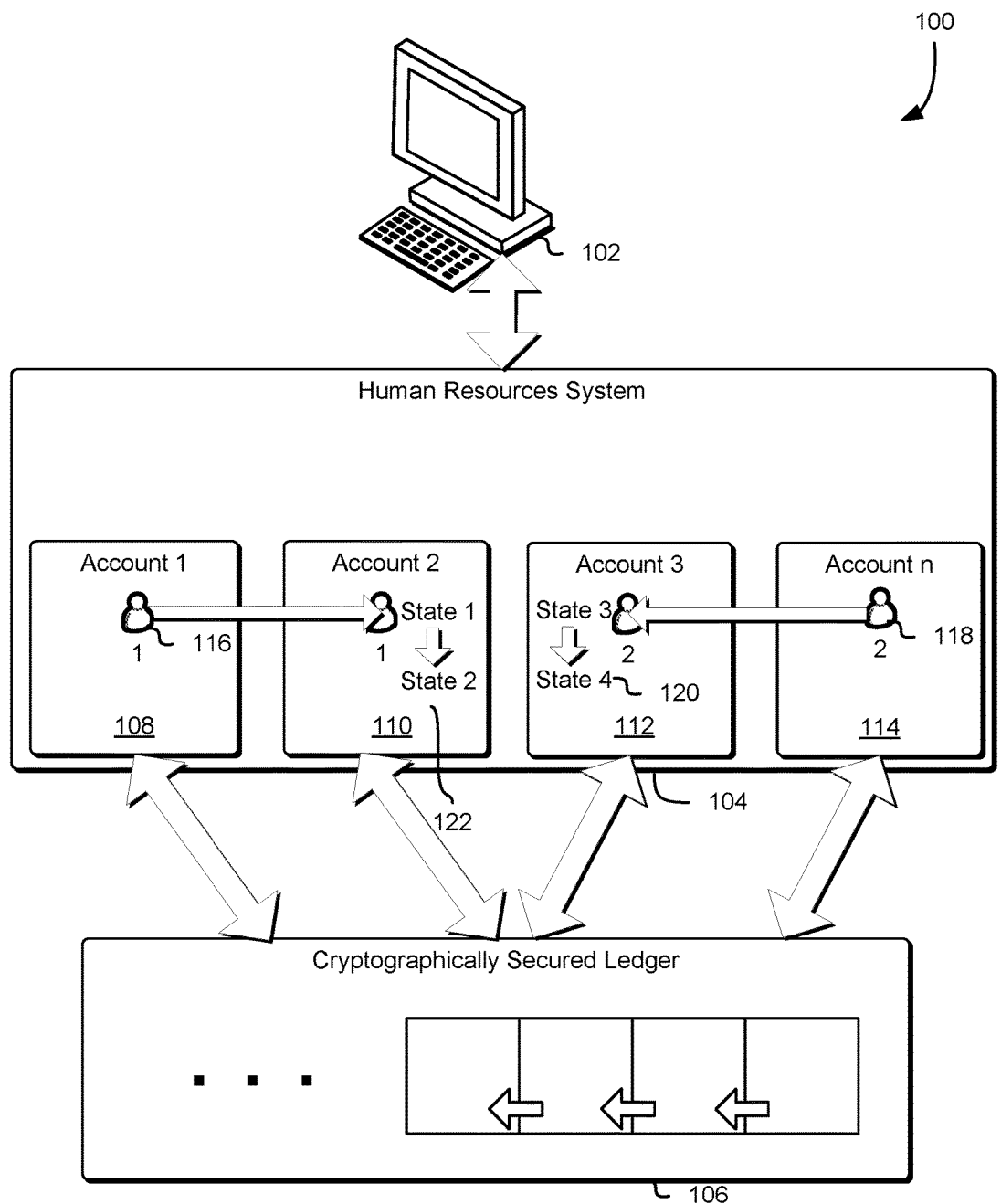
FIG. 1 illustrates an example environment where state changes for entities, such as employee objects and administrative accounts, tracked and/or implemented by a human resources system, are committed to and further tracked by a cryptographically secured ledger, in accordance with some embodiments.

In one example, access to one or more human resources systems, such as human resources management systems that implement one or more human resources functions (e.g., benefits administration, payroll, recruiting, performance analysis/review, training, etc.), is provided to one or more requestors. The human resources system(s) implement one or more cryptographically secured ledger(s), such as blockchains, to record transactions associated with information administered by the system. Such information may include, for example, employee objects tracked, administered, or otherwise associated with the human resources system, and transactions may involve one or more state changes associated with the employee objects. Examples of such state changes include employment state changes associated with the employee, a transfer of the employee from one cost center to another cost center, a change in the hierarchical position of the employee, a change in the employee's job family, or any change to any other attribute associated with the employee (and thus, the employee object).

In some embodiments, the human resources systems are implemented such that they provide one or more data representations that reflect a current state (or prior state) of a given object. The state at any point in time may be calculated by, e.g., the human resource system, based on an associated set of transactions stored in the cryptographically secured ledger for the object. For example, the human resources system may be, or may implement, a database that reflects contents, states, and other information contained within the cryptographically secured ledger. In some embodiments, the database is read-only; that is, write transactions (e.g., to the fields or other contents of the database table) are either ignored or discarded.

In this example, the immutability of transactions written to the cryptographically secured ledger is fully retained, and any changes to objects represented by the cryptographically secured ledger (and thus exposed through the associated databases) occur through a separate type of interaction, e.g., directly with the cryptographically secured ledger so as to write new transactions. The associated database table may be updated synchronously (or, in some cases, asynchronously) in connection with a given cryptographically secured ledger update.

In another example, the database table accepts both reads and writes, such as updates to rows, columns, etc., that represent other attribute fields, cost center assignments, status information, etc., associated with a given employee object. In such examples, an implementing human resources system may process the writes such that it determines an associated transaction or set of transactions to write to the cryptographically secured ledger so as to reflect the updated database table.

As mentioned, the cryptographically secured ledger itself may accept new transactions in different ways depending on the implementation. For example, a cryptographically secured ledger may be updated using implied or explicit trust (e.g., certificates, cryptographic signatures, etc., that identify and/or authenticate/authorize the updating entity, and so long as the entity is identified by the cryptographically secured ledger authority as authorized to add a transaction to the ledger, it may do so with no constraints or impediments other than those specified for the transaction itself, such as by a database engine, an implemented schema, an implementing application, etc.). While this disclosure focuses on providing ledger updates to a requestor, e.g., via an exposed service, so long as they provide cryptographic proof or other attestation as to their authority, other examples may include distributed consensus via proof of work, such as in environments where one or more submitting entities may be hostile or otherwise not fully verified or verifiable. In some embodiments, the cryptographically secured ledger itself is also exposed as a ledger, which may then be verified, e.g., by a requestor by traversing the ledger and verifying the hash values of the linked blocks, and/or the current chained hash value relative to a known "correct" value.

It may be appreciated that recording various transactions, such as state change transactions such as account transfers, in a cryptographically secured ledger would provide an immutable audit trail for those transactions, with the cryptographically secured ledger inherently providing a "trustless" verification (i.e., no specific authority, such as that of an implementing distributed computing resource provider, is necessary to verify the integrity of the cryptographically secured ledger or the data contained therein, on account of the chained strong cryptographic hash outcomes computed for each committed block of data in the chain).

In some embodiments, a plurality of cryptographically secured ledgers may be implemented, where each ledger of the plurality has one or more dependencies or other connections with some or all of the other ledgers, either directly (as between the ledgers), indirectly (e.g., through one or more different human resources systems connected with the respective ledgers), or some combination thereof. In some embodiments, the some or all of the ledgers may be tiered in a hierarchy, where transactions in one ledger "rolls up" to another ledger (which stores hash values or other confirmation data for each block of the ledger). The hierarchy may partly or entirely follow a hierarchy associated with the implementation of the human resources systems themselves.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment where state changes for entities, such as employee objects and administrative accounts, tracked and/or implemented by a human resources system, are committed to and further tracked by a cryptographically secured ledger, in accordance with some embodiments.

In one example, access to a human resources system 104 is provided to a requestor 102, such as a client device operated by a customer of an implementing computing resource service provider. The human resources system 104 records one or more transactions associated with objects 116, 118, such as transfers between accounts 108, 110, 112, 114 as illustrated, or state changes 120, 122 as illustrated, in a cryptographically secured ledger 106, such as a blockchain.

The human resources system 104 may be any human resources management system that implements one or more human resources functions. For example, the human resources system 104 may be a system that oversees, administers, and/or transacts information related to one or more of benefits administration, payroll, recruiting, performance analysis/review, training, employee attributes (such as employee status, pay grade/type, job family and/or title, name, employee identifier, tax-related information, and the like), etc. As discussed further herein, an organization may implement a plurality of human resources systems 104 to administer different aspects of human resources management.

In some embodiments, the human resources system 104 implements and/or accesses a database, such as a relational database or a non-relational (e.g., NoSQL) database, to provide access to requestors to data representations of objects administered by the human resources system 104. In an embodiment, a managed, distributed, non-relational database is provided as a database service by the same computing resource service provider that also provides access (e.g., also as a service) to a cryptographically secured ledger 106, and a NoSQL database is used so as to ease integration between the two (owing to the more flexible data modeling/schema definitions enabled by non-relational databases). Furthermore, such non-relational databases may be selected for their improved latency, throughput, and/or scalability relative to traditional relational databases. However, in some embodiments, a relational database may also be used, e.g., in implementations where absolute relational consistency is desired.

The human resources system(s) 104 may be implemented on or using any computational resources, such as those provided by a computing resource service provider. For example, the human resource system(s) 104 may be software running on dedicated hardware resources of the computing resource service provider. As another example, the human resource system(s) 104 may be implemented using one or more virtual computing resources implemented on one or more hardware resources available to the computing resources service provider. As discussed further herein, the human resource system(s) 104 may communicate with and/or utilize one or more services (other services, in the case where the human resource system(s) itself is a service provided by the computing resource service provider) of a computing resource service provider.

The computing resource service provider may provide a variety of services to the customer and the customer may communicate with the computing resource service provider via an interface, which may be a web services interface or any other type of customer interface. Each service may have its own interface and, generally, subsets of the services may have corresponding interfaces in addition to or as an alternative to the interface. The customer may be an organization that may utilize one or more of the services provided by the computing resource service provider to maintain and deliver information to its employees, which may be located in various geographical locations. Additionally, the customer may be an individual that utilizes the services of the computing resource service provider to deliver content to a working group located remotely. The customer may communicate with the computing resource service provider through a network, whereby the network may be a communication network, such as the Internet, an intranet or an Internet service provider (ISP) network. Some communications from the customer to the computing resource service provider may cause the computing resource service provider to operate in accordance with one or more embodiments described or a variation thereof.

As mentioned, the computing resource service provider may provide various computing resource services to its customers. The services provided by the computing resource service provider may include a virtual computer system service, a block-level data storage service, a cryptography service, an on-demand data storage service, a notification service, an authentication system, a policy management service, a task service, and one or more other services. It is noted that not all embodiments described include all services described, and additional services may be provided in addition to or as an alternative to services explicitly described. As described, each of the services may include one or more web service interfaces that enable the customer to submit appropriately configured API calls to the various services through web service requests. In addition, each of the services may include one or more service interfaces that enable the services to access each other (e.g., to enable a virtual computer system of the virtual computer system service to store data in or retrieve data from the on-demand data storage service and/or to access one or more block-level data storage devices provided by the block level data storage service).

The virtual computer system service may be a collection of computing resources configured to instantiate virtual machine instances on behalf of the customer. The customer may interact with the virtual computer system service (via appropriately configured and authenticated API calls) to provision and operate virtual computer systems that are instantiated on physical computing devices hosted and operated by the computing resource service provider. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications.

The block-level data storage service may comprise one or more computing resources that collectively operate to store data for a customer using block-level storage devices (and/or virtualizations thereof). The block-level storage devices of the block-level data storage service may, for instance, be operationally attached to virtual computer systems provided by the virtual computer system service to serve as logical units (e.g., virtual drives) for the computer systems. A block-level storage device may enable the persistent storage of data used/generated by a corresponding virtual computer system where the virtual computer system service may only provide ephemeral data storage.

The computing resource service provider also includes a cryptography service. The cryptography service may utilize one or more storage services of the computing resource service provider to store keys of the customers in encrypted form, whereby the keys may be usable to decrypt the customer keys accessible only to particular devices of the cryptography service.

The computing resource service provider further includes an on-demand data storage service. The on-demand data storage service may be a collection of computing resources configured to synchronously process requests to store and/or access data. The on-demand data storage service may operate using computing resources (e.g., databases) that enable the on-demand data storage service to locate and retrieve data quickly, to allow data to be provided in responses to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects which may be used by the customer to retrieve or perform other operations in connection with the data objects stored by the on-demand data storage service.

In some embodiments, a notification service is implemented by the computing resources service provider. The notification service may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service may provide notifications to clients using a "push" mechanism without the need to periodically check or "poll" for new information and updates. The notification service may further be used for various purposes such as monitoring applications executing in the virtual computer system service, workflow systems, time-sensitive information updates, mobile applications, and many others.

The computing resource service provider, in various embodiments, includes an authentication system and a policy management service. The authentication system, in an embodiment, is a computer system (i.e., collection of computing resources) configured to perform operations involved in authentication of users of the customer. For instance, one of the services and may provide information from a user to the authentication system to receive information in return that indicates whether the user requests are authentic.

The policy management service, in an embodiment, is a computer system configured to manage policies on behalf of customers (such as customer) of the computing resource service provider. The policy management service may include an interface that enables customers to submit requests related to the management of policy. Such requests may be, for instance, requests to add, delete, change, or otherwise modify policy for a customer or for other administrative actions, such as providing an inventory of existing policies and the like.

The computing resource service provider, in various embodiments, is also equipped with a task service. The task service is configured to receive a task package from the customer and enable executing tasks as dictated by the task package. The task service may be configured to use any resource of the computing resource service provider, such as one or more instantiated virtual machines or virtual hosts, for executing the task. The task service may configure the one or more instantiated virtual machines or virtual hosts to operate using a selected operating system and/or a selected execution application in accordance with a requirement of the customer.

The computing resource service provider additionally maintains one or more other services based at least in part on the needs of its customers. For instance, the computing resource service provider may maintain a database service for its customers. A database service may be a collection of computing resources that collectively operate to run one or more databases for one or more customers. The customer may operate and manage a database from the database service by utilizing appropriately configured API calls. This, in turn, may allow a customer to maintain and potentially scale the operations in the database. Other services include, but are not limited to, object-level archival data storage services, services that manage and/or monitor other services.

As mentioned, the human resources system(s) 104 implement one or more cryptographically secured ledger(s) 106, such as blockchains, to record transactions associated with information administered by the system. The cryptographically secured ledger 106 is, in some embodiments, a distributed database that comprises multiple linked, or "chained" blocks of data, such as a blockchain. At least in the case of cryptographically secured ledger 106, the blocks may include employee objects or links thereto, transaction information (ownership transfers from one account to another, and the like), metadata regarding transactions and/or the objects themselves, schema information related to frameworks for representing the employee objects (e.g., as data representations via the connected human resource system(s) 104), permission information identifying actors and/or entities authorized to access, modify, and/or transfer objects represented in the cryptographically secured ledger, and the like. The blocks and/or the individual recorded objects and transactions may also include a timestamp (e.g., of generation or addition of the block or associated transactions/objects), and information linking it to a previous block or object in the cryptographically secured ledger. This information may include, in some embodiments, a proof of work or other computational evidence reflecting integrity data and/or calculations performed by any entity attempting to add such data to the cryptographically secured ledger, e.g., by adding blocks of transactions during a specific period of time to the cryptographically secured ledger.

The proof of work is, in some embodiments, the outputted hash digest of performing a cryptographic hash function on the contents of a presumptive block to be committed, where some of the data in the block (e.g., a counter, a random number, etc.) is changed repeatedly until the resultant hash digest meets specific criteria set for acceptance of the new block into the cryptographically secured ledger. For example, the cryptographically secured ledger (or implementing system) may require, as a condition for adding a given block to the cryptographically secured ledger, that the hash digest of the presumptive block include a specified number of leading binary or hexadecimal zeros in the outcome, or has a value lower than a specified difficulty value. Such criteria may be tuned or otherwise set to ensure that the number of iterations required of the submitting entity is computationally large or difficult enough to make submissions, and thus back-propagated changes, sufficiently difficult (e.g., as a property of the cryptographically secured ledger, the header of a given block includes the proof of work outcome of the previous block, and thus a proof of work for all blocks after a given block would need to be recalculated in sequence as the resultant value of the computation of the next block would differ if the underlying data was altered after the fact).

In certain embodiments, rather than using a proof of work as a proxy for trusted addition of data to the ledger, the ledger may be exposed to requestors, such as the client entity 102 (and, in some cases, the human resources system 104), as a service. In such embodiments, a requestor entity provides evidence of its authority in connection with its request to directly update the ledger with new information. For example, the request may be made through an interface, such as a programmatic interface provide by or on behalf of the cryptographically secured ledger 106, and in some cases may include a cryptographic certificate, digital signature, cryptographic key, or some other attestation of identity or authority. To the extent that the attestation associated with the ledger update request is sufficient to execute the update requested, the ledger implies trust and performs the update.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

Note further that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

The blocks of the cryptographically secured ledger 106 include groups of one or more sets of data as mentioned herein, as well as other data and metadata related to the event data, such as an outcome of a cryptographic hash of the other data in the block of transactions, which in some cases includes a reference to (or an outcome of) a cryptographic hash performed against the immediately preceding block of data or transactions. Accordingly, it may be appreciated that, assuming the use of a strong one-way cryptographic hash function, a post hoc change to data in an earlier block (e.g., one further down the chain) would result in a domino effect of changes to hash outcomes of each subsequent block.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that $f(x)=y$ is below a specified threshold), second preimage resistance (given an input $x1$, the probably of randomly generating another input $x2$, different from $x1$, such that $f(x1)=f(x2)$ is below a specified threshold) and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

As previously mentioned, cryptographically secured ledgers, such as blockchains, may be distributed databases, and in some embodiments, each of a plurality of entities/resources responsible for maintaining the cryptographically secured ledger has a copy of the entirety of the cryptographically secured ledger at any given point (e.g., all blocks added to that point). As individual transactions and/or blocks are added to the cryptographically secured ledger 106, information regarding those transactions (which may the added data itself) is broadcasted to all nodes/entities/resources. As a given resource (which may be the same or different than those maintaining the cryptographically secured ledger) adds a block that encompasses/includes transactions over a period of time associated with that block, the contents of the new block are distributed to each node/entity/resource in the cryptographically secured ledger so that, eventually, the cryptographically secured ledger reflects a consistent state.

As may be contemplated, the collection of entities/resources maintaining and/or contributing to the cryptographically secured ledger may be heterogeneous in nature. For example, both customer devices (including client device 102) and resources associated with the service can participate in maintaining the cryptographically secured ledger, as well as participate in the computational activity (e.g., signature verification) that adds blocks to the cryptographically secured ledger, as the identity of the actor performing the maintenance or addition is largely irrelevant given that all other participating nodes can confirm the integrity and/or veracity of any new added block, and indeed the integrity of the entire cryptographically secured ledger, by simply checking performing the cryptographic hash function against the block contents (e.g., the most recent block, in the case of the entire cryptographically secured ledger) to see if the outcome meets that which is expected (e.g., an outcome for the same block or set of blocks at a previous point in time). Accordingly, no single actor or set of actors need be trusted as an authority with respect with the integrity of the cryptographically secured ledger, as any requestor may perform the relatively inexpensive computations themselves to verify the cryptographically secured ledger's integrity to whatever extent they desire.

As mentioned, the cryptographically secured ledger 106 persists information related to transactions involving objects manipulated by the human resources system 104. Such information may include, for example, employee objects tracked, administered, or otherwise associated with the human resources system, and transactions may involve one or more state changes associated with the employee objects. As another example, transactions may involve changes to accounts or other data associated with the objects. As may be contemplated, the objects may include not just employee objects, but cost center objects, job position objects, employee state objects, organizational/hierarchical structure objects, and the like, and changes to such objects or attributes associated with them may be processed into transactions to be committed to the cryptographically secured ledger.

The transactions may be structured such that objects are transferred from one account to a different account, where the objects represent the entity for which one or more attributes or assignments are changed, and the accounts represent one or more aspects of an organization's organizational (e.g., hierarchical structure). For example, accounts may be assigned, on a one-to-one basis, to different cost centers. Other examples include accounts organized according to an organizational structure (e.g. as represented by a hierarchical organizational chart), accounts organized by employee state (e.g., hired, transferred, leave of absence, terminated, etc.), and any other enumerable attribute associated with the object. In some embodiments, accounts may be associated with one or more subaccounts, which in some cases may be subservient to the accounts with which they are associated. For example, a transaction may include a transfer between one cost center account and another, as well as a transfer between one employee state subaccount and another (e.g., nominal or "employed" state to "promoted"). Other examples of subaccounts may include cost centers (if other attributes are used for the main accounts), other attributes, job titles, and the like.

As illustrated, an employee object 116 may be transferred from a first account 108 to a different second account 110 (also illustrated with respect to an employee object 118 being transferred from a first account 114 to a different account 112). This may, as just mentioned, involve a transfer of an associated employee from one employment classification to another, between cost centers, etc. In some cases, the employee object may also transfer between a first state to a different second state 122, 120. Such state changes may involve a transaction between a first subaccount to a second subaccount, as mentioned. Such subaccount transfers may be part of the same transaction as a transfer from one parent account to another. In other examples, a subaccount transfer may generate a different transaction from that which was associated with a transfer between parent accounts.

Examples of state changes resulting in a transaction include employment state changes associated with the employee, a transfer of the employee from one cost center to another cost center, a change in the job title or hierarchical position of the employee, a change in the employee's job family, or any change to any other attribute associated with the employee (and thus, the employee object). As mentioned, each change or set of changes is recorded in the cryptographically secured ledger 106 as one or more transactions, and such transactions are committed, in some embodiments, after one or more confirmations generated entities implementing the cryptographically secured ledger (e.g., so as to ensure the integrity of the data being committed). As previously mentioned, in some cases, these confirmations are the result of one or more operations resulting in proof of work. In other cases, the confirmations are the result of mutual or implied trust, e.g., as the result of a validated attestation of identity of the requestor.

In some embodiments, certain states or state types are externally accessible and/or visible, while others are internal only. The permissions associated with states may be set in a policy, and/or may be set by way of the system implementation (e.g., by an administrator thereof). In such cases where certain states are differentiable for being internal and/or external, in some embodiments, changes involving internal states may be recorded in a separate cryptographically secured ledger from those involving external states. Entities accessing the cryptographically secured ledger or systems dependent thereupon may do so according to whether they have permission to access such cryptographically secured ledgers, and accordingly, may only view, audit, etc. states and changes relevant to their permissions (e.g., internal vs. external).

Figure 2:
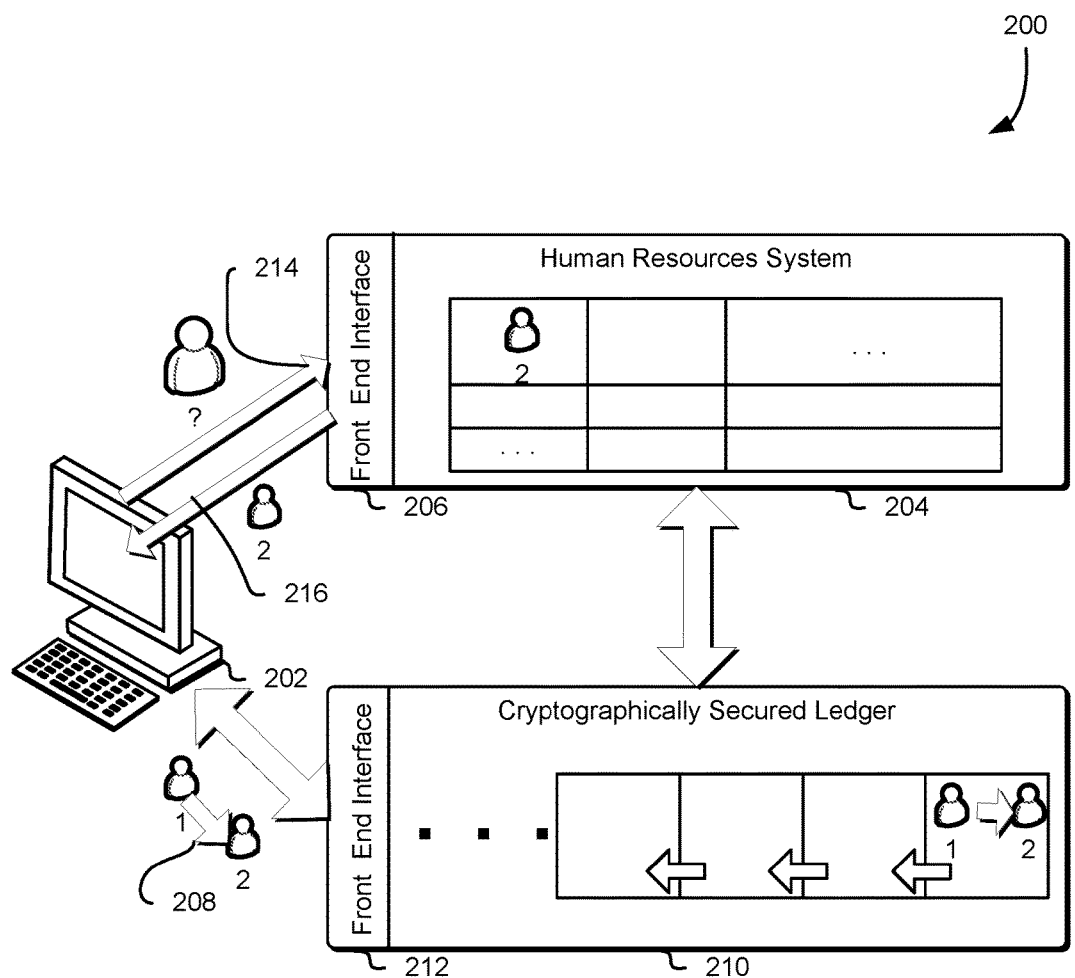
FIG. 2 illustrates an example environment in which a transaction for an entity administered by a human resources system is manipulated using a cryptographically secured ledger connected with the human resources system, in accordance with some embodiments.

FIG. 2 illustrates an example environment in which a transaction for an entity administered by a human resources system is manipulated using a cryptographically secured ledger connected with the human resources system, in accordance with some embodiments.

In some embodiments, the human resources systems are implemented such that they provide one or more data representations that reflect a current state (or prior state) of a given object. The state at any point in time may be calculated by, e.g., the human resource system, based on an associated set of transactions stored in the cryptographically secured ledger for the object.

For example, the human resources system may be, or may implement, a separate database that reflects contents, states, and other information contained within the cryptographically secured ledger. In some embodiments, the database is read-only; that is, write transactions (e.g., to the fields or other contents of the database table) are either ignored or discarded. In this example, the immutability of transactions written to the cryptographically secured ledger is fully retained, and any changes to objects represented by the cryptographically secured ledger (and thus exposed through the associated databases) occur through a separate type of interaction, e.g., directly with the cryptographically secured ledger so as to write new transactions. The associated database table may be updated synchronously (or, in some cases, asynchronously) in connection with a given cryptographically secured ledger update.

In another example, the database table accepts both reads and writes, such as updates to rows, columns, etc., that represent other attribute fields, cost center assignments, status information, etc., associated with a given employee object. In such examples, an implementing human resources system may process the writes such that it determines an associated transaction or set of transactions to write to the cryptographically secured ledger so as to reflect the updated database table.

As mentioned, the cryptographically secured ledger 210 itself may accept new transactions in different ways depending on the implementation. For example, a cryptographically secured ledger may be updated using implied or explicit trust (e.g., certificates, cryptographic signatures, etc., that identify and/or authenticate/authorize the updating entity, and so long as the entity is identified by the cryptographically secured ledger authority as authorized to add a transaction to the ledger, it may do so with no constraints or impediments other than those specified for the transaction itself, such as by a database engine, an implemented schema, an implementing application, etc.). While this disclosure focuses on providing ledger updates to a requestor, e.g., via an exposed service, so long as they provide cryptographic proof or other attestation as to their authority, other examples may include distributed consensus via proof of work, such as in environments where one or more submitting entities may be hostile or otherwise not fully verified or verifiable. In some embodiments, the cryptographically secured ledger itself is also exposed as a ledger, which may then be verified, e.g., by a requestor by traversing the ledger and verifying the hash values of the linked blocks, and/or the current chained hash value relative to a known "correct" value.

It may be appreciated that recording various transactions, such as state change transactions such as account transfers, in a cryptographically secured ledger would provide an immutable audit trail for those transactions, with the cryptographically secured ledger inherently providing a "trustless" verification (i.e., no specific authority, such as that of an implementing distributed computing resource provider, is necessary to verify the integrity of the cryptographically secured ledger or the data contained therein, on account of the chained strong cryptographic hash outcomes computed for each committed block of data in the chain).

In some embodiments, a plurality of cryptographically secured ledgers may be implemented, where each ledger of the plurality has one or more dependencies or other connections with some or all of the other ledgers, either directly (as between the ledgers), indirectly (e.g., through one or more different human resources systems connected with the respective ledgers), or some combination thereof. In some embodiments, the some or all of the ledgers may be tiered in a hierarchy, where transactions in one ledger "rolls up" to another ledger (which stores hash values or other confirmation data for each block of the ledger). The hierarchy may partly or entirely follow a hierarchy associated with the implementation of the human resources systems themselves.

As mentioned, the cryptographically secured ledger 210 may accept new transactions in different ways depending on the implementation. For example, the cryptographically secured ledger 210 may be updated using implied or explicit trust (e.g., certificates, cryptographic signatures, etc. that identify and/or authenticate/authorize the updating entity, and so long as the entity is identified by the cryptographically secured ledger authority as authorized to add a transaction to the ledger, it may do so with no constraints or impediments other than those specified for the transaction itself, such as by a database engine, an implemented schema, an implementing application, etc.). While this disclosure focuses on providing ledger updates to a requestor, e.g., via an exposed service through its programmatic interface (e.g., an API), so long as they provide cryptographic proof or other attestation as to their authority, as mentioned, other examples may include distributed consensus via proof of work, such as in environments where one or more submitting entities may be hostile.

As mentioned, a database may be implemented by human resources system 204 to interact with the cryptographically secured ledger 210 to reflect, via one or more data representations, the contents, states, and other information contained within the cryptographically secured ledger 210. In some embodiments, the cryptographically secured ledger 210, through its programmatic interface 212, "pushes" updates when they occur to the database, also through its respective programmatic interface 210. In other embodiments, the human resources system 204 may poll, manually (e.g., in response to a request) or automatically (e.g., at a specified interval) the cryptographically secured ledger 210 for updates since the last update. In addition, an interstitial entity, such as a database engine or other entity associated with either/both the database 204 and/or the cryptographically secured ledger 210, may be employed to convert or otherwise represent the state of a given piece of data, such as an object or other "first class" data type, from the associated transaction(s) over time as represented in the ledger, in the database table. For example, as described elsewhere herein, the database table may be structured such that it reflects only the current state of a given object. As another example, the database engine or other interstitial entity may translate some or all transactions associated with a given object and make it individually visible via the database table. In some embodiments, the database table may be constrained to a specified length of time over which transactions have been committed to the ledger, a specific type of data (e.g., field or data type), a specified number of updates (e.g., transactions), and so on.

The data representation is, in some instances, the format in which the human resources system 204 reflects the information in the cryptographically secured ledger 210. The data representation may be specific to the particular implementing human resources system 204 (e.g., for the purpose for which the system 204 was implemented, and reflecting/projecting the data in accordance with that purpose), and may be defined by one or more mechanisms. For example, a schema may be implemented to associate the raw transactional data persisted in the cryptographically secured ledger 210 with objects, as well as metadata associated with those objects. The schema may define the specific fields, columns, or rows for the associated data and metadata, and as previously mentioned, may be treated simply as another object in the cryptographically secured ledger (e.g., updates and/or ownership transactions, and constraints associated with those transactions, may also be applied to schema objects). In this example, a given record, as defined in the schema, may be associated with an object, and may also include metadata associated with the object, such as a current owner (e.g., account), links to associated objects (e.g., other employee objects in the hierarchy, such as a superior employee/manager), creator information, and the like, and the records may be represented in a database table exposed by the human resources system 204. Accordingly, rather than directly query the inherently serial cryptographically secured ledger 210, a requestor 202 may merely query the generated database table of the human resources system 204 in a familiar format for quick and efficient retrieval of information related to objects held or otherwise represented in the cryptographically secured ledger 210.

In some embodiments, the database is read-only; that is, write transactions (e.g., to the fields or other contents of the database table) are either ignored or discarded. In this example, any changes to objects represented by the cryptographically secured ledger (and thus exposed through the associated databases) occur through a separate type of interaction, e.g., directly with the cryptographically secured ledger through its respective interface, so as to write new transactions. As previously mentioned, the associated database table may be updated synchronously (or, in some cases, asynchronously) in connection with a given cryptographically secured ledger update. In other examples, the database table accepts both reads and writes, such as updates to rows, columns, etc., as would be the case if a client entity 202 attempts to update account ownership of a given object. In these cases, an implementing system may process the writes such that it determines an associated transaction or set of transactions to write to the cryptographically secured ledger 210 so as to reflect the updated database table, and such ledger writes would be subject to verification of a requestor's authority to do so.

As mentioned, in the illustrated example, the cryptographically secured ledger 210 is exposed as a ledger via a front end interface 212 to a client entity 202 or other requestor. The front end interface 212 (as with front end interface 206 for the database 204) may be a graphical or command-line user interface, a programmatic interface (such as an application programming interface (API) or web service call), or any appropriate interface. By way of example, the client device 202 may submit, e.g., status update requests 208 for a given object represented in the cryptographically secured ledger 210. The request 208 is verified, e.g., by way of verifying the integrity and/or provenance of a digital signature or cryptographic key included with the request 208 (or separately therefrom), as well as the authority of the identity associated with the signature or key to make the requested ownership transfer 208. The verification may be made by any appropriate entity, including a third party cryptographic service, an entity associated with the cryptographically secured ledger 210, the client entity 202 itself (in the case of a self-authenticating certificate), or some other entity.

The actual trust proof or attestation may be sourced from a cryptographic device or service of the client entity 202 (e.g., local hardware security modules or trusted platform modules), issued by a third party authority or other cryptographic service, or any other appropriate, verifiable way for the identity and integrity of the issuing entity and/or that of the requesting entity to be ascertained. For example, a cryptographic key, such as a wrapped key, may be issued by a service of the computing resource service provider to the client entity 202 for submission to the front end interface 212 of the cryptographically secured ledger 210.

The front end interface 212 passes the request 208 to an entity associated with the cryptographically secured ledger 210 to determine whether the request 208 is valid and any constraints, e.g., on other objects or limiting the requestor's authority to make the associated change, apply. For example, if a given object is associated with a key, a defining schema or database engine may automatically require that any change associated with that object be initiated by the holder (or some delegatee) of that key. Consequently, in this example, if a request 208 comes from some unauthorized or untrusted entity, it is rejected.

In some embodiments, such as those involving different nodes/systems in disparate locales in a distributed system, conflicting information may be submitted to the ledger for commission. For example, time and attendance, and/or payroll systems, may have multiple actors attempting to make changes to the same employee object in response to a given event, at least some of which may cause an untenable or mixed state with regard to that employee object (or the state being changed). In such embodiments, consistency verification or voting methods, where the nodes of the ledger determine whether the proposed change is consistent with respect of the previous state by way of majority (or other threshold) vote, may be employed to verify the correct state change or object state.

However, assuming that any constraints and/or requirements are met, the cryptographically secured ledger 210 commits the transaction. As previously mentioned, such writes, once executed, are immutable so as to preserve the audit trail. If the ownership transaction is performed in error, the holder of the "new" key submits a new transaction to revert ownership back to the original holder, which would be written to the cryptographically secured ledger 210 as a new transaction.

As previously mentioned, the database 204 reflects the new state of the cryptographically secured ledger in tabular or other form, depending on the implementation details of the database, as well as the way in which it is updated (e.g., as described above in connection with FIG. 1). Consequently, if the client device 202 issues a request 214 to the database 204 via its front end interface 206 inquiring as to the current ownership of a given asset, the database 204 will return, via its front end interface 206, a response 216 indicating the new owner. Other implementations where the database reflect not just the current state of the cryptographically secured ledger, but also includes every transaction committed to the ledger 210, are contemplated as within scope of the present disclosure. For example, in such implementations, a database query requesting a history of object-related transactions over a specific time period, or over all time represented in the cryptographically secured ledger 210, or since the object itself came into existence, could be serviced in a more efficient manner than a similar request directed directly to the cryptographically secured ledger 210.

However, while the examples presented in connection with FIG. 2 as illustrated involve the use of an interstitial database implemented by the human resources system to provide data representations of one or more transactions involving objects as persisted in a cryptographically secured ledger, the data representations may be generated without the use of such a database. For example, the human resources system may directly generate and commit transactions to the ledger, and on a request in connection with a data representation, may directly determine which transactions to read directly from the ledger and generate the response directly in connection with the data representation.

Figure 3:
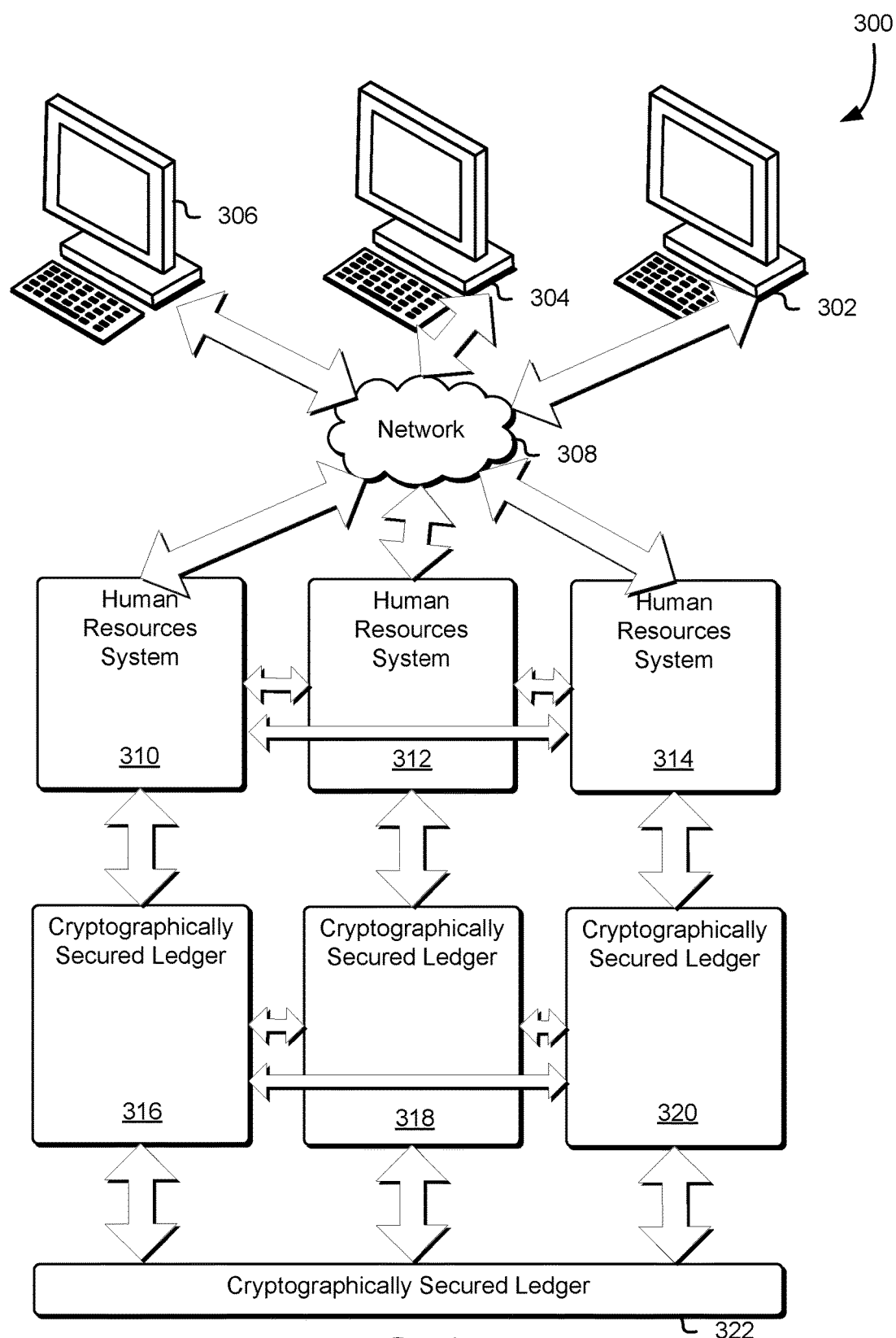
FIG. 3 illustrates an example environment in which a plurality of client entities or other requestors interact with a plurality of human resources systems backed by a plurality of cryptographically secured ledgers, in accordance with some embodiments.

FIG. 3 illustrates an example environment in which a plurality of client entities or other requestors interact with a plurality of human resources systems backed by a plurality of cryptographically secured ledgers, in accordance with some embodiments.

As previously mentioned, in some embodiments, a plurality of cryptographically secured ledgers may be implemented, where each ledger of the plurality has one or more dependencies or other connections with some or all of the other ledgers, either directly (as between the ledgers), indirectly (e.g., through one or more different human resources systems connected with the respective ledgers), or some combination thereof. In some embodiments, the some or all of the ledgers may be tiered in a hierarchy, where transactions in one ledger "rolls up" to another ledger (which stores hash values or other confirmation data for each block of the ledger). The hierarchy may partly or entirely follow a hierarchy associated with the implementation of the human resources systems themselves.

Accordingly, FIG. 3 illustrates, by way of example, a plurality of client devices 302, 304, 306 connecting to a plurality of human resources system 310, 312, 314 via a suitable network 308, such as a virtual private network, the Internet, a local area network, a cellular network, etc. As illustrated, the human resources systems 310, 312, 314 correspond to a plurality of cryptographically secured ledgers 316, 318, 320. As mentioned, the human resources systems 310, 312, 314, may be variously implemented to provide different (or redundant, in some cases) human resources functionalities, and the ledgers 316, 318, 320 may each be implemented for a specific human resources system 310, 312, 314. In some embodiments, there may be a many to one, or a one to many relationship, between a ledger and a human resources system. For example, a given system may implement or connect with a plurality of ledgers, each of which persists a different set of transactions (e.g., according to object type, transaction type, etc.). As another example, multiple systems may connect with and commit transactions to the same ledger.

As illustrated, the systems 310, 312, 314 may interact amongst each other, so as to transact and coordinate various interconnected operations. Similarly, the ledgers 316, 318, 320 may also be connected, such that a transaction committed to one of the ledgers may cause an associated transaction in on or more of the other ledgers.

In some embodiments, a "roll-up" or tiered ledger 322 may be implemented to provide additional data security, auditability, assurances, immutability, and/or the like, by committing blocks of confirmation data, such as hash values for committed blocks, derived from one or more of the other ledgers 316, 318, 320. Accordingly, an audit of the integrity of the ledger 322 may provide assurances as to the integrity of the other ledgers 316, 318, 320.

Figure 4:
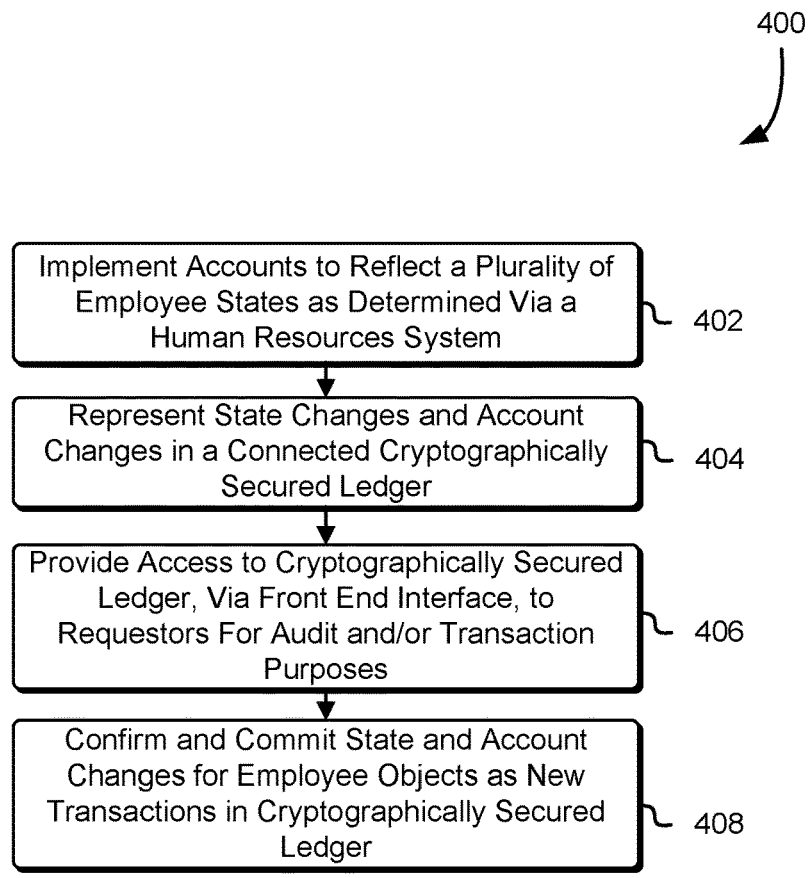
FIG. 4 illustrates an example process by which a cryptographically secured ledger is integrated with a human resources system, in accordance with some embodiments.

FIG. 4 illustrates an example process by which a cryptographically secured ledger is integrated with a human resources system, in accordance with some embodiments.

At step 402, an entity, such as a computing resources service provider and/or a human resources system, generates and implements accounts associated with a cryptographically secured ledger, such as a blockchain. As previously mentioned, the accounts may be implemented for one or more states or attributes associated with employee objects, as determined by or using an implementing human resources system.

At step 404, state or attribute changes associated with an employee object (e.g., reassignment from one cost center to another, as one example) are committed by the implementing human resources system to the connected cryptographically secured ledger. For example, such state changes may be processed by the human resources system to determine one or more transactions to commit to the cryptographically secured ledger, such as an transfer of an employee object from one account to another.

At step 406, the cryptographically secured ledger is exposed to requestors via a front end interface, such as an application programming interface. For example, the front end interface may be provided for requestors, such as client entities (and in some cases the human resources system), to audit the committed data, commit further transactions, perform queries regarding a set of transactions, and the like.

At step 408, any changes or other updates related to attributes, states, ownership, etc., of objects presently reflected in the cryptographically secured ledger (e.g., in step 404, and as received in step 406), are further processed by the human resources system to determine one or more transactions, which are confirmed by and subsequently committed (if confirmed) to the cryptographically secured ledger.

Figure 5:
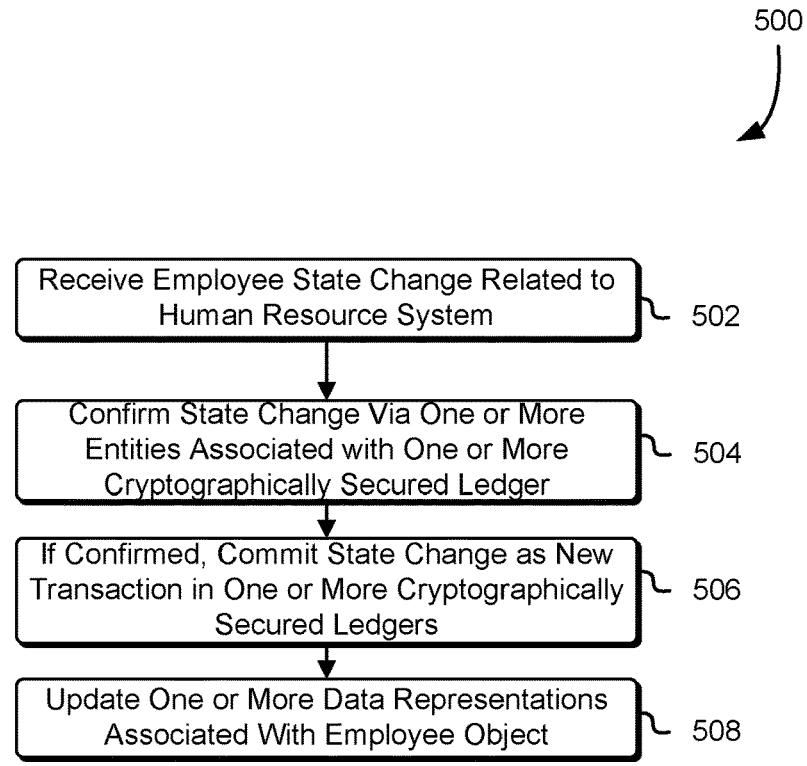
FIG. 5 illustrates an example process for processing employee or other object-related transactions represented in a cryptographically secured ledger-backed human resources system, in accordance with some embodiments.

FIG. 5 illustrates an example process for processing employee or other object-related transactions represented in a cryptographically secured ledger-backed human resources system, in accordance with some embodiments.

At step 502, a system, such as a human resources system, receives a request to change a state associated with an employee tracked and/or administered by the system. At step 504, the system attempts to confirm the state change with one or more entities implementing or otherwise associated with a cryptographically secured ledger, such as a blockchain, used by the human resource system to immutably commit the change. For example, the state change may be accompanied by a proof of work or attestation that confirms the validity and/or integrity of the change being made.

If the state change is confirmed, at step 506, the state change is committed to the cryptographically secured ledger as one or more transactions, such as an account transfer and/or attribute update, associated with the associated object (e.g., employee object). At step 508, after commission of the transaction to the ledger, one or more data representations are updated (and in some cases, provided to the requestor), by the implementing system, such as by use of an interstitial database.

Figure 6:
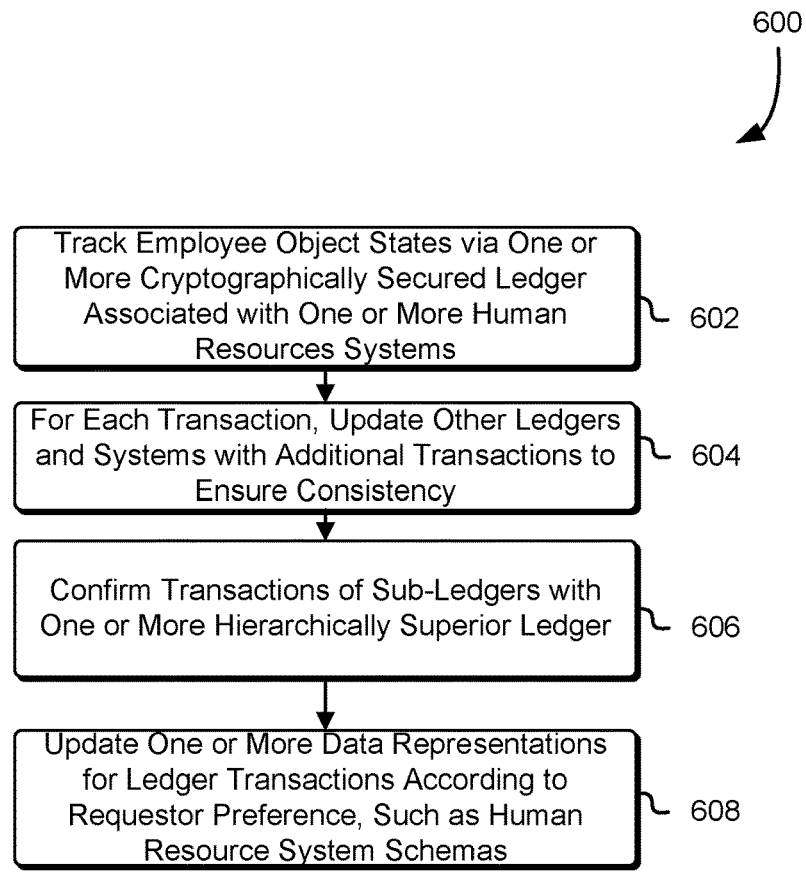
FIG. 6 illustrates an example process for processing and tracking transactions using a plurality of interconnected ledgers implemented to track object states and related transactions for a plurality of human resources systems, in accordance with some embodiments.

FIG. 6 illustrates an example process for processing and tracking transactions using a plurality of interconnected ledgers implemented to track object states and related transactions for a plurality of human resources systems, in accordance with some embodiments.

At step 602, one or more cryptographically secured ledgers, such as blockchains, associated with one or more human resources systems (e.g., as illustrated in connection with FIG. 3), tracks a plurality of employee object states and/or attributes. As previously discussed, different types of states and/or attributes may be committed to different ledgers by different systems.

At step 604, for each transaction committed to a given ledger, one or more of the other ledgers and/or connected systems are updated so as to ensure consistency across the ledgers and systems. In implementations where a single ledger is used for multiple systems, the consistency of the data persisted may be assumed, and the data representations generated by the multiple systems may be assumed to be accurate as of the time they are generated.

At step 606, a "roll-up" ledger persists, as transactions, the confirmation data associated with one or more subservient ledgers (e.g., hierarchical in a lower tier), thereby allowing for an auditing requestor to determine by assessing the contents of the "roll-up" ledger the integrity of all other ledgers "rolling up" to it.

At step 608, the data representations for objects are updated as exposed by the systems are updated, e.g., periodically or on request, according to a requestor or administrator's preference. As previously mentioned, the manner of the data representations may be partially or fully defined by policies or schemas that direct a given system as to how to format and/or process the transactions in the ledger(s) for representation via the system(s).

Figure 7:
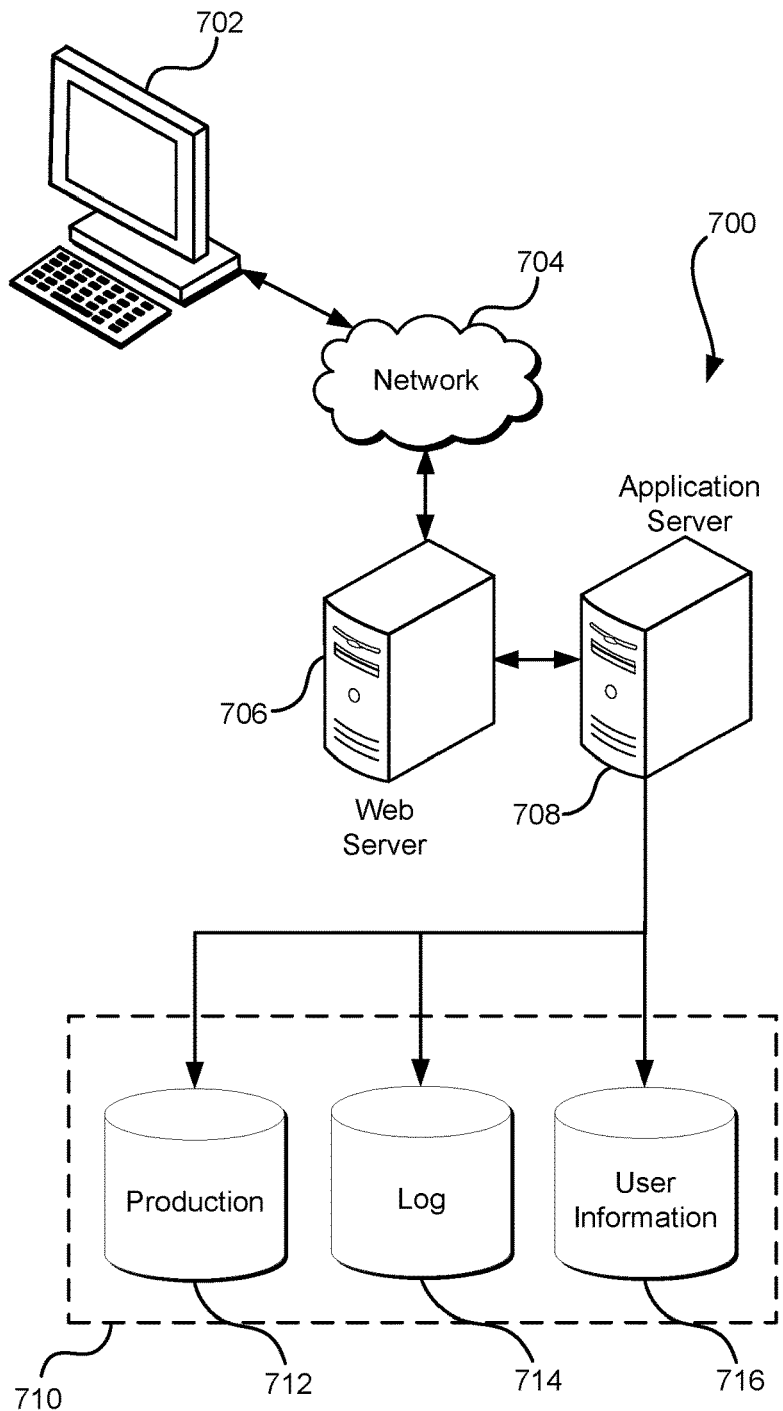
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes, and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update, or otherwise process data in response thereto. The application server 708 may provide static, dynamic, or a combination of static and dynamic data in response to the received instructions. Dynamic data, such as data used in web logs (blogs), shopping applications, news services, and other such applications may be generated by server-side structured languages, as described herein, or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory, as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    under the control of one or more computer systems configured with executable instructions,
        receiving, by a human resources system implemented by the one or more computer systems, a request to update a first state of an employee object to a different second state of the employee object;
        generating a transaction associated with the request;
        confirming the transaction with a plurality of entities implementing a blockchain ledger;
        committing the transaction to the blockchain ledger;
        in response to committing the transaction to the blockchain ledger, updating one or more data representations of a database implemented by the human resources system to reflect the second state, wherein the one or more data representations are associated with the employee object;
        receiving a second request, for a current state of the employee object; and
        providing, via the database implemented by the human resources system, the one or more data representations as part of fulfilling the second request.

2. The computer-implemented method of claim 1, wherein the update to the second state includes a reassignment of the employee object from a first account implemented by the human resources system to a different second account implemented by the human resources system, wherein the first account and the second account are both parent accounts according to a hierarchical structure object.

3. The computer-implemented method of claim 2, wherein the first account and the second account are different cost centers tracked by the human resources system.

4. The computer-implemented method of claim 1, wherein the one or more data representations are specific to a configuration of the human resources system.

5. A human resources system, comprising:
    at least one computing device that implements one or more services, wherein the one or more services:
        receive, by the system, a request to update a first state of an object administered by the system to a different second state of the object;
        generate a transaction associated with the request;
        commit the transaction to the cryptographically secured ledger;
        based on committing the transaction, update a database implemented by the system to reflect the different second state; and
        provide, in response to a second request for a current state of the object and via the database, information related to the transaction.

6. The human resources system of claim 5, wherein the object is an employee object.

7. The human resources system of claim 6, wherein the first state and the second state are both employment statuses associated with an employee associated with the employee object.

8. The human resources system of claim 6, wherein the first state and the second state are associated with a respective assignment of the employee object to a respective cost center.

9. The human resources system of claim 6, wherein the first state and the second state are associated with a change in an attribute associated with the employee object.

10. The human resources system of claim 6, wherein the update is associated with a change in an organizational structure represented by the system.

11. The human resources system of claim 5, wherein the transaction is associated with transferring the object from a first account to a different second account implemented by the cryptographically secured ledger.

12. The human resources system of claim 11, wherein the first account and the second account are associated with a respective different entity of an organizational structure represented by the human resources system.

13. A non-transitory computer-readable storage medium having stored thereon executable instructions that, as a result of being executed by one or more processors of a computer system, cause the computer system to at least:
    receive a request to update a first state of an object associated with an employee entity administered by the computer system to a different second state of the object;
    process the request to generate a transaction for a cryptographically secured ledger associated with the computer system;
    commit the transaction to the cryptographically secured ledger;
    as a result of committing the transaction to the cryptographically secured ledger, cause a second transaction to be committed to a different cryptographically secured ledger; and
    provide information related to the second state based at least in part on the transaction and the second transaction.

14. The non-transitory computer-readable storage medium of claim 13, wherein the transaction is associated with updating an account to which the object is assigned.

15. The non-transitory computer-readable storage medium of claim 14, wherein the account is associated with a cost center to which an employee associated with the employee entity is assigned.

16. The non-transitory computer-readable storage medium of claim 13, wherein the second transaction is based at least in part on the first transaction.

17. The non-transitory computer-readable storage medium of claim 16, wherein the second transaction includes a cryptographic confirmation of the first transaction having been committed.

18. The non-transitory computer-readable storage medium of claim 13, wherein the cryptographically secured ledger and the different cryptographically secured ledger are associated with different respective human resources systems.

19. The non-transitory computer-readable storage medium of claim 13, wherein the transaction is committed as a result of a proof of work challenge being completed by a number of entities implementing the cryptographically secured ledger.

20. The non-transitory computer-readable storage medium of claim 13, wherein the transaction is committed in connection with a verification of an identity associated with the request.

* * * * *